(12) United States Patent
Bhanushali (10) Patent No.: US 12,430,949 B2
(45) Date of Patent: Sep. 30, 2025

(54) SYSTEMS AND METHODS FOR PERSON CLASSIFICATION AND GESTURE RECOGNITION

(71) Applicant: Valeo North America, Inc., Troy, MI (US)

(72) Inventor: Jagdish Bhanushali, Troy, MI (US)

(73) Assignee: VALEO SCHALTER UND SENSOREN GMBH (DE)

( * ) Notice: Subject to any disclaimer, the term of this patent is extended or adjusted under 35 U.S.C. 154(b) by 361 days.

(21) Appl. No.: 18/092,384

(22) Filed: Jan. 2, 2023

(65) Prior Publication Data

US 2024/0221425 A1  Jul. 4, 2024

(51) Int. Cl.
G06V 40/20 (2022.01)
G06V 10/764 (2022.01)
G06V 20/58 (2022.01)
G06V 40/10 (2022.01)

(52) U.S. Cl.
CPC ............ G06V 40/20 (2022.01); G06V 10/764 (2022.01); G06V 20/58 (2022.01); G06V 40/10 (2022.01)

(58) Field of Classification Search
CPC ........ G06V 40/20; G06V 20/58; G06V 40/10; G06V 10/764
See application file for complete search history.

(56) References Cited

U.S. PATENT DOCUMENTS

| | | | |
|---|---|---|---|
| 2018/0204111 A1* | 7/2018 | Zadeh | G06V 10/764 |
| 2020/0247432 A1* | 8/2020 | Misra | B60W 50/0097 |
| 2020/0310433 A1 | 10/2020 | Mukherjee | |
| 2020/0394393 A1 | 12/2020 | Kraft et al. | |
| 2021/0012100 A1 | 1/2021 | Hoffmann et al. | |
| 2021/0279893 A1* | 9/2021 | Iwanowski | G06V 10/143 |
| 2022/0135081 A1 | 5/2022 | Lee et al. | |
| 2022/0198180 A1 | 6/2022 | Weaver et al. | |
| 2022/0309795 A1* | 9/2022 | Jakobsen | G06V 40/172 |

(Continued)

FOREIGN PATENT DOCUMENTS

CN 110 858 295 A 3/2020

OTHER PUBLICATIONS

Detects Chinese traffic police commanding poses, Chinese Traffic Police Pose, https://github.com/zc402ChineseTrafficPolicePose, retrieved on Jan. 2, 2023.

(Continued)

*Primary Examiner* — Pinalben Patel
(74) *Attorney, Agent, or Firm* — Dickinson Wright PLLC (57) ABSTRACT

A method includes receiving image data that includes at least two images of an environment associated with a vehicle, identifying at least one person of interest in the image data, and generating, using a pose estimation model and the image data, a representation of the person of interest. The method also includes determining at least one characteristic associated with the at least two images of the image data and providing, to a machine learning model, at least the representation of the person of interest and the at least one characteristic associated with the at least two images of the image data. The method also includes receiving, from the machine learning model, a gesture prediction indicating a predicted gesture being made by the person of interest, and causing the vehicle to take at least one action based on the gesture prediction.

20 Claims, 8 Drawing Sheets

(56) References Cited

U.S. PATENT DOCUMENTS

2022/0318560 A1    10/2022  Kishon et al.
2022/0331028 A1*   10/2022  Sternitzke ............ G05D 1/0094

OTHER PUBLICATIONS

Xiong, X. et al., Traffic Police Gesture Recognition Based on Gesture Skeleton Extractor and Multichannel Dilated Graph Convolution Network, Electronics, 2021, 10, 551, https://doi.org/10.3390/electronics10050551.

Wiederer, J. et al., Training and evaluation kit for traffic control gesture recognition on the TCG dataset, https://github.com/againerju/tcg_recognition, retrieved on Jan. 2, 2023.

Wiederer, J. et al., Traffic Control Gesture Recognition for Autonomous Vehicles, IEEE, 2020.

Implementation of the techniques presented in "Co-occurrence Feature Learning from Skeleton Data for Action Recognition" to recognize two-dimensional skeleton, Action recognition by 2D skeleton analysis, https://github.com/andreagemelli/Action-recognition-by-2D-skeleton-analysis, retrieved on Jan. 2, 2023.

\* cited by examiner

SYSTEMS AND METHODS FOR PERSON CLASSIFICATION AND GESTURE RECOGNITION

TECHNICAL FIELD

The present disclosure relates to action or gesture recognition, and in particular to systems and methods for person classification and action or gesture recognition.

BACKGROUND

Vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing various image capturing devices to identify objects in an environment associated with such vehicles. For example, an autonomous or semi-autonomous vehicle may process images captured using an image capturing device associated with the vehicle to identify one or more traffic signals in an environment in which the vehicle is being operated.

Such image processing may include various techniques using three-dimensional image processing or other suitable image processing to identify various objects of interest. However, typical image processing may be relatively resource intensive (e.g., including computing and/or processing resources associated with the vehicle). Further, increasingly, performing such image processing includes using machine learning techniques, which may be increasingly resource intensive.

SUMMARY

An aspect of the disclosed embodiments includes a method for identifying gestures. The method includes receiving image data that includes at least two images of an environment associated with a vehicle, identifying at least one person of interest in the image data, and generating, using a pose estimation model and the image data, a representation of the person of interest. The method also includes determining at least one characteristic associated with the at least two images of the image data and providing, to a machine learning model, at least the representation of the person of interest and the at least one characteristic associated with the at least two images of the image data. The method also includes receiving, from the machine learning model, a gesture prediction indicating a predicted gesture being made by the person of interest, and causing the vehicle to take at least one action based on the gesture prediction.

Another aspect of the disclosed embodiments includes a system for identifying gestures. The system includes a processor and a memory. The memory includes instructions that, when executed by the processor, cause the processor to: receive image data that includes at least two images of an environment associated with a vehicle; identify at least one person of interest in the image data; generate, using a pose estimation model and the image data, a representation of the person of interest; determine at least one characteristic associated with the at least two images of the image data; provide, to a machine learning model, at least the representation of the person of interest and the at least one characteristic associated with the at least two images of the image data; receive, from the machine learning model, a gesture prediction indicating a predicted gesture being made by the person of interest; and cause the vehicle to take at least one action based on the gesture prediction.

Another aspect of the disclosed embodiments includes an apparatus for identifying gestures. The apparatus includes a processor and a memory. The memory includes instructions that, when executed by the processor, cause the processor to: receive image data that includes at least two images of an environment associated with a vehicle; identify at least one person of interest in the image data; generate, using a pose estimation model and the image data, a two-dimensional skeletal representation of the person of interest; determine at least one characteristic associated with the at least two images of the image data, wherein the at least one characteristic includes at least one of a temporal difference, a bone joint distance, and a bone angle; provide, to a machine learning model, at least the two-dimensional skeletal representation of the person of interest and the at least one characteristic associated with the at least two images of the image data; receive, from the machine learning model, a gesture prediction indicating a predicted gesture being made by the person of interest; and cause the vehicle to take at least one action based on the gesture prediction.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing various image capturing devices to identify objects in an environment associated with such vehicles. For example, an autonomous or semi-autonomous vehicle may process images captured using an image capturing device associated with the vehicle to identify one or more traffic signals in an environment in which the vehicle is being operated.

Such image processing may include various techniques using three-dimensional image processing or other suitable image processing to identify various objects of interest. However, typical image processing may be relatively resource intensive (e.g., including computing and/or processing resources associated with the vehicle). Further, increasingly, performing such image processing includes using machine learning techniques, which may be increasingly resource intensive.

Typical systems may use red-green-blue (RGB) images as input to a deep neural network, such as a three-dimensional convolutional neural network, without feature extraction. This may take a significant amount of time to process gesture sequences and require extensive training data. Further, typical systems may use an extraction pose estimation as input to a long short-term memory network or a graph convolution network, which may be faster to train and provide an inference relative to a three-dimensional convolutional neural network, but may be relatively slow (e.g., and resource intensive) for a real time inference.

Accordingly, systems and methods, such as the systems and methods described herein, configured to provide improved gesture recognition, may be desirable. In some embodiments, the systems and methods described herein may be configured to use a convolutional neural network architecture that treats time sequences of pose-estimation as an image, which may be relatively easy to train and may provide relatively faster real time inference. The systems and methods described herein may be configured to achieve similar accuracy as using pose-estimation and a graph convolutional network, while decreasing training time of the neural network, using fewer data samples for training, and providing faster inference for a real time application.

In some embodiments, the systems and methods described herein may be configured to recognize or understand various actions of pedestrians and traffic controllers on a road being traversed by a vehicle (e.g., which may include an autonomous or semi-autonomous vehicle configured to react to actions of other road users relatively quickly). The systems and methods described herein may be configured to recognize static gestures and/or dynamic gestures. Static gestures may include a stop gesture, a turn right gesture, a turn left gesture, other suitable static gestures, or a combination thereof. Dynamic gestures may include a pull over gesture, a move forward gesture, a move backward gesture, a move right gesture, a move left gesture, other suitable dynamic gesture, or a combination thereof.

Figure 3A:
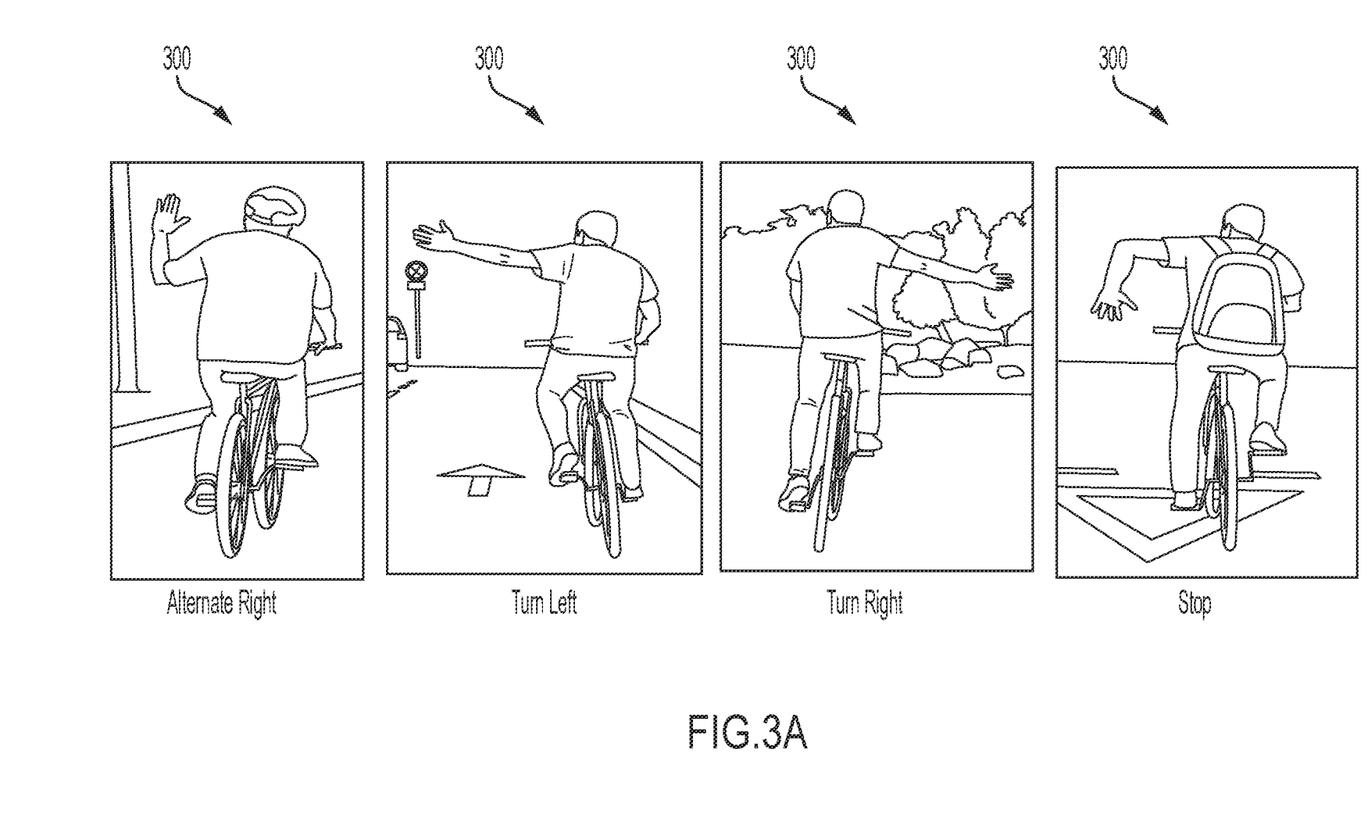
FIG. 3A generally illustrates various gestures made by one or more persons of interest in one or more images according to the principles of the present disclosure.
Figure 3B:
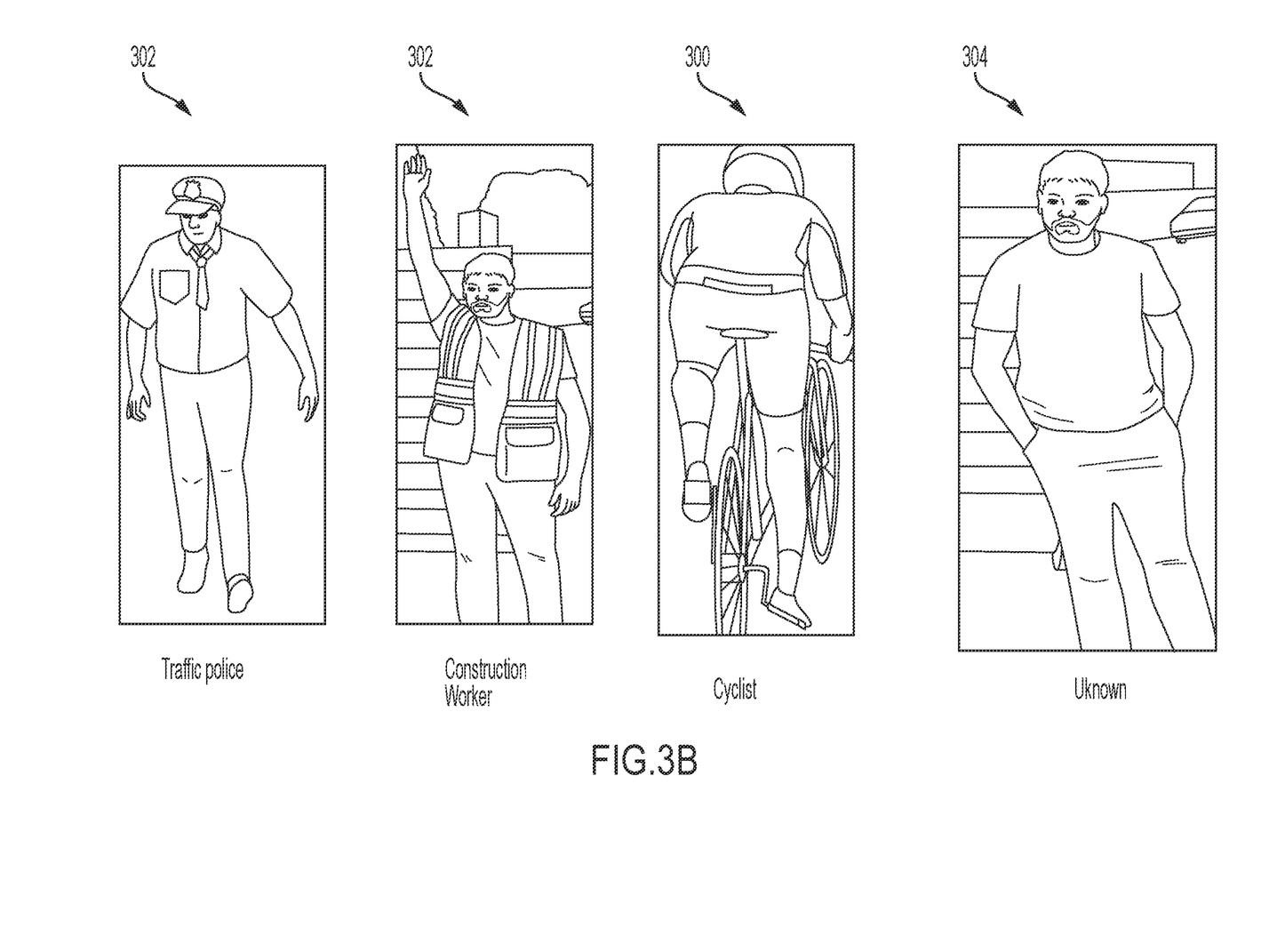
FIG. 3B generally illustrates various authorized persons of interest in one or more images according to the principles of the present disclosure.

FIG. 3A generally illustrates an example dataset for a person of interest 300 on a bicycle. It should be understood that the person of interest 300 being on a bicycle is used as an example and the person of interest 300 may use any suitable vehicle, such as a motor cycle, three-wheeled vehicle, scooter, and the like, while making gestures described herein. The dataset illustrated in FIG. 3A may include images that include the cyclist making a stop gesture, a turn right gesture, an turn left gesture, and an alternate right gesture. It should be understood that the gesture dataset for cyclists may include any suitable number of images including any suitable cyclist making any suitable gesture, in addition to or instead of those described herein. FIG. 3B generally illustrate an example dataset for an authorized person of interest 302, such as a police officer, a construction worker, and the like. The dataset may also include other persons of interest, such as cyclists 300 and unknown persons 304, such that, when used to train the network, the network learns to distinguish between the various authorized persons of interest 302, cyclists 300, and/or unknown persons of interest 304.

In some embodiments, the systems and methods described herein may be configured to identify an authorized person of interest 302 in one or more images captured by an image capturing device associated with the vehicle. The systems and methods described herein may be configured to use a skeleton based action technique (e.g., without using a graph convolutional network). The systems and methods described herein may be configured to track multiple people and understand associated gestures made by respective people of the multiple people. The systems and methods described herein may be configured to use key point differences and/or bone angle using, at least, sine angles and cosine angles.

In some embodiments, the systems and methods described herein may be configured to receive image data that includes at least two images of an environment associated with a vehicle. The systems and methods described herein may be configured to identify at least one person of interest in the image data. The systems and methods described herein may be configured to generate, using a pose estimation model and the image data, a representation of the person of interest. The representation of the person of interest may include a two-dimensional representation of the person of interest, a skeletal representation of the person of interest, any other suitable representation of the person of interest, or a combination thereof.

The systems and methods described herein may be configured to determine at least one characteristic associated with the at least two images of the image data. The at least one characteristic associated with the at least two images may include at least one of a temporal difference between at least one aspect of the person of interest in the at least two images, a bone joint distance for at least one aspect of the person of interest, and at least one bone angle for at least one bone of the person of interest. The bone joint distance may correspond to a distance of a bone visible in an image of the two or more images from a first location on the person of interest to a second location on the person of interest. For example, a first bone joint distance may correspond to a first length of a forearm visible in a first image between a location on a hand corresponding to the forearm and a location on an elbow corresponding to the forearm. Additionally, or alternatively, a second bone joint distance may correspond to a second length of the forearm visible in a second image between the location on the hand corresponding to the forearm and the location on the elbow corresponding to the forearm. The at least one bone angle may include a cosine angle relative to the at least one bone, a sine angle relative to the at least one bone, and/or any other suitable angle relative to the at least one bone. The at least one bone angle may be formed by any suitable portion of the body of the person of interest. For example, the at least one angle may be formed between a position of a forearm bone relative to a position of a shoulder bone of the person of interest, between a position of a forearm bone relative to the rest of the body of the person of interest, between a positon of a hand and a position of a wrist of the person of interest, or other suitable positions of other suitable aspects of the body of the person of interest.

The systems and methods described herein may be configured to provide, to a machine learning model, at least the representation of the person of interest and the at least one characteristic associated with the at least two images of the image data. The machine learning model may include any suitable model, such as a convolutional neural network or other suitable machine learning model. The machine learning model may be initially trained using gesture data. The gesture data may include data corresponding to a person performing various actions and annotations, which may include one or more skeleton representations of the person and what kind of actions the person is doing. The machine learning model may be subsequently trained using at least the gesture prediction. For example, a user may provide feedback indicating the accuracy of the gesture prediction. The machine learning model may be subsequently trained using the feedback.

The systems and methods described herein may be configured to receive, from the machine learning model, a gesture prediction indicating a predicted gesture being made by the person of interest. The systems and methods described herein may be configured to cause the vehicle to take at least one action based on the gesture prediction.

Figure 1:
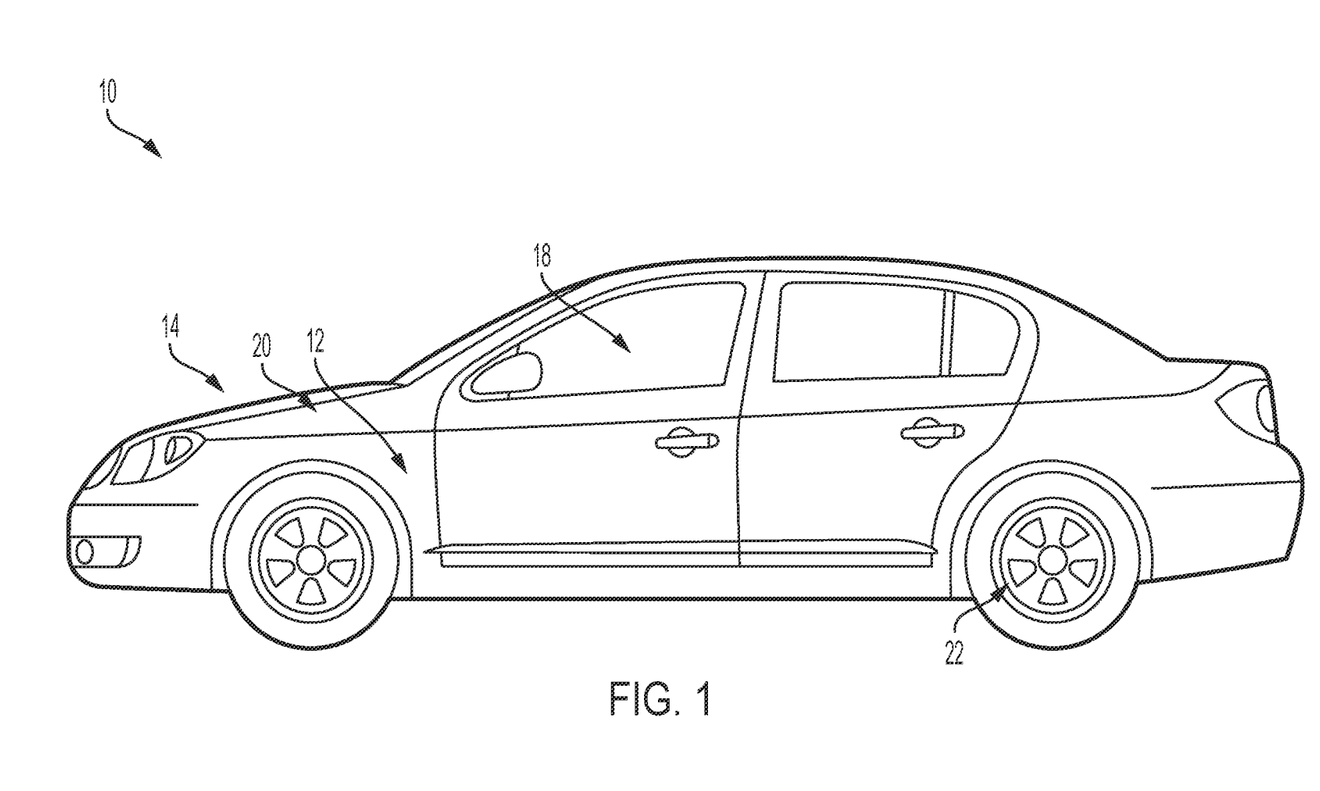
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels 22 and for use on roads, the principles of the present disclosure may apply to other vehicles, such as planes, boats, trains, drones, or other suitable vehicles. The vehicle 10 may include any level of automation, such that the vehicle 10 may comprise no automation or may comprise a semi-autonomous vehicle or autonomous vehicle.

The vehicle 10 includes a vehicle body 12, a hood 14, and a passenger compartment 18 at least partially defined by the vehicle body 12. The hood 14 may be moveably attached to a portion of the vehicle body 12, such that the hood 14 provides access to an engine compartment 20. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system (e.g., house at least partially within the engine compartment 20) including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. Additionally, or alternatively, propulsion controls, such as an accelerator actuator (e.g., an accelerator pedal), a brake actuator (e.g., a brake pedal), a steering wheel, and other such components are disposed in the passenger compartment 18. The propulsion controls may be actuated or controlled by a driver of the vehicle 10 and may be directly connected to corresponding components of the propulsion system, such as a throttle, a brake, a vehicle axle, a vehicle transmission, and the like, respectively.

In some embodiments, the vehicle 10 includes a transmission that may include a manual transmission, an automatic transmission, and the like. The vehicle 10 may include one or more pistons, in the case of an internal combustion engine or a hybrid vehicle, which cooperatively operate with a crankshaft to generate force, which is translated through the transmission to one or more axles, which turns wheels 22. When the vehicle 10 includes one or more electric motors, one or more vehicle batteries and/or one or more fuel cells provide energy to the electric motors to turn the wheels 22.

In some embodiments, the vehicle 10 may include a suitable communication network, such as a controller area network (CAN) comprising a CAN bus or other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
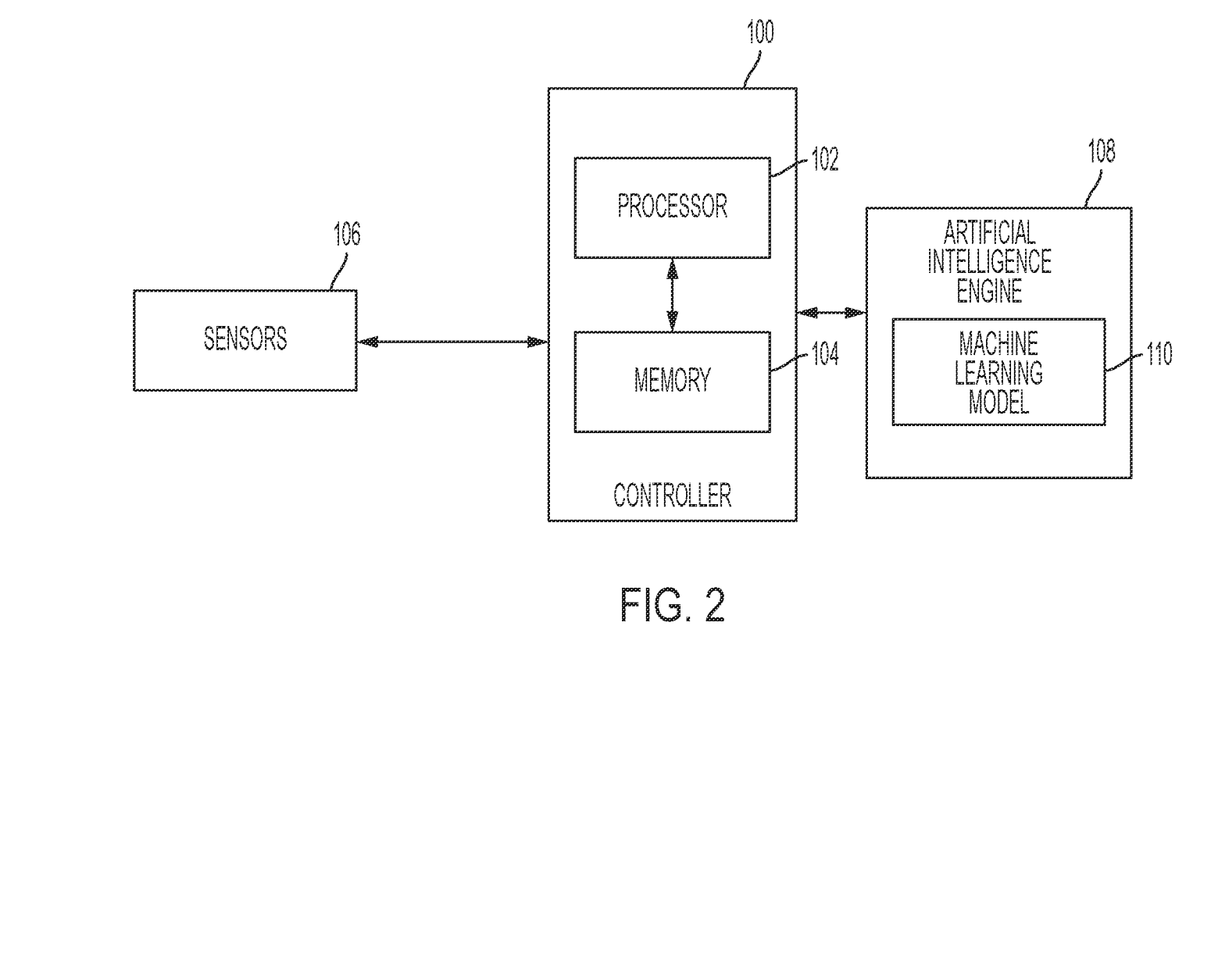
FIG. 2 generally illustrates a vehicle controller according to the principles of the present disclosure.

In some embodiments, the steering system may include a controller, such as controller 100, as is generally illustrated in FIG. 2. The controller 100 may include any suitable controller. The controller 100 may be configured to control, for example, the various functions of the vehicle systems described herein. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system and/or any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more motor position sensor or devices, one or more image capturing sensors or devices, one or more audio capturing sensors or devices, other suitable sensors or devices, or a combination thereof. The one or more signals may indicate a vehicle speed, image data corresponding to an environment of the vehicle 10, audio data associated with the environment or other aspects of the vehicle 10, other suitable information, or a combination thereof.

In some embodiments, the controller 100 may use an artificial intelligence engine 108 configured to use at least one machine learning model 110 to perform the embodiments of systems and methods described herein. The artificial intelligence engine 108 may include any suitable artificial intelligence engine and may be disposed within the vehicle 10 or remotely located from the vehicle 10, such as in a cloud computing device or other suitable remotely located computing device. The artificial intelligence engine 108 may use one or more machine learning models 110 to perform at least one of the embodiments disclosed herein. The controller 100 may include a training engine capable of generating the one or more machine learning models 110. The machine learning models 110 may include any suitable model, including, but not limited to, a convolutional neural network. The machine learning model 110 may be trained using data that comprising images of individuals or groups of individuals in various environments. Various similarity techniques may be used to remove duplicate data. Additionally, or alternatively, the images may be fine-tuned to remove any undesirable samples. Additionally, or alternatively, various post-estimation techniques may be used to filter samples which contain a full body of individuals or groups of individuals in the images. The machine learning model 110, having been trained using the training data, may be configured to identify gestures made by one or more persons of interest in a plurality of images provided as input to the machine learning model 110. The machine learning model 110 may output a gesture prediction indicating a predicted gesture being made by at least one person of interest in the plurality of images and/or a confidence score indicating a confidence level of the prediction.

In some embodiments, the controller 100 may be configured to identify gestures being made by one or more individuals (e.g., persons) within an environment associated with the vehicle 10 (e.g., in front of the vehicle 10, at an angle relative to the front of the vehicle 10, next to the vehicle 10, behind the vehicle 10, and the like). The individuals may include authorized individuals, such as police, firefighters, traffic controllers, construction workers, and the like. The controller 100 may control one or more aspects of the vehicle 10 in response to one or more gestures made by the authorized individuals (e.g., such as controlling one or more brakes of the vehicle 10 to bring the vehicle 10 to a stop or to reduce a speed of the vehicle 10, control one or more wheels 22 of the vehicle 10 to turn the vehicle 10 in order to follow a directional instruction indicated by the one or more gestures, and the like).

Additionally, or alternatively, the individuals may include pedestrians, cyclists, individuals waiting for a ride share, individuals attempting to signal the vehicle 10 (e.g., to hire the vehicle 10 for a ride), and the like. The controller 100 may control at least one aspect of the vehicle 10 in response to one or more gestures made by the individuals (e.g., such as controlling propulsion and/or one or more wheels 22 of vehicle 10 in order to pull the vehicle 10 over to pick up a ride share or to avoid a pedestrian, controlling the one or more brakes of the vehicle 10 to bring the vehicle 10 to a stop responsive to the one or more gestures indicating a cyclist is stopping, and the like). In should be understood that the controller controlling one or more aspects of the vehicle 10 may include the controller providing instructions to one or more other controllers of the vehicle 10 and/or providing an output to a display of the vehicle 10 or other suitable display for an operator of the vehicle (e.g., such that the operator of the vehicle 10 controls the one or more aspects of the vehicle 10 based on the instructions).

Figure 4:
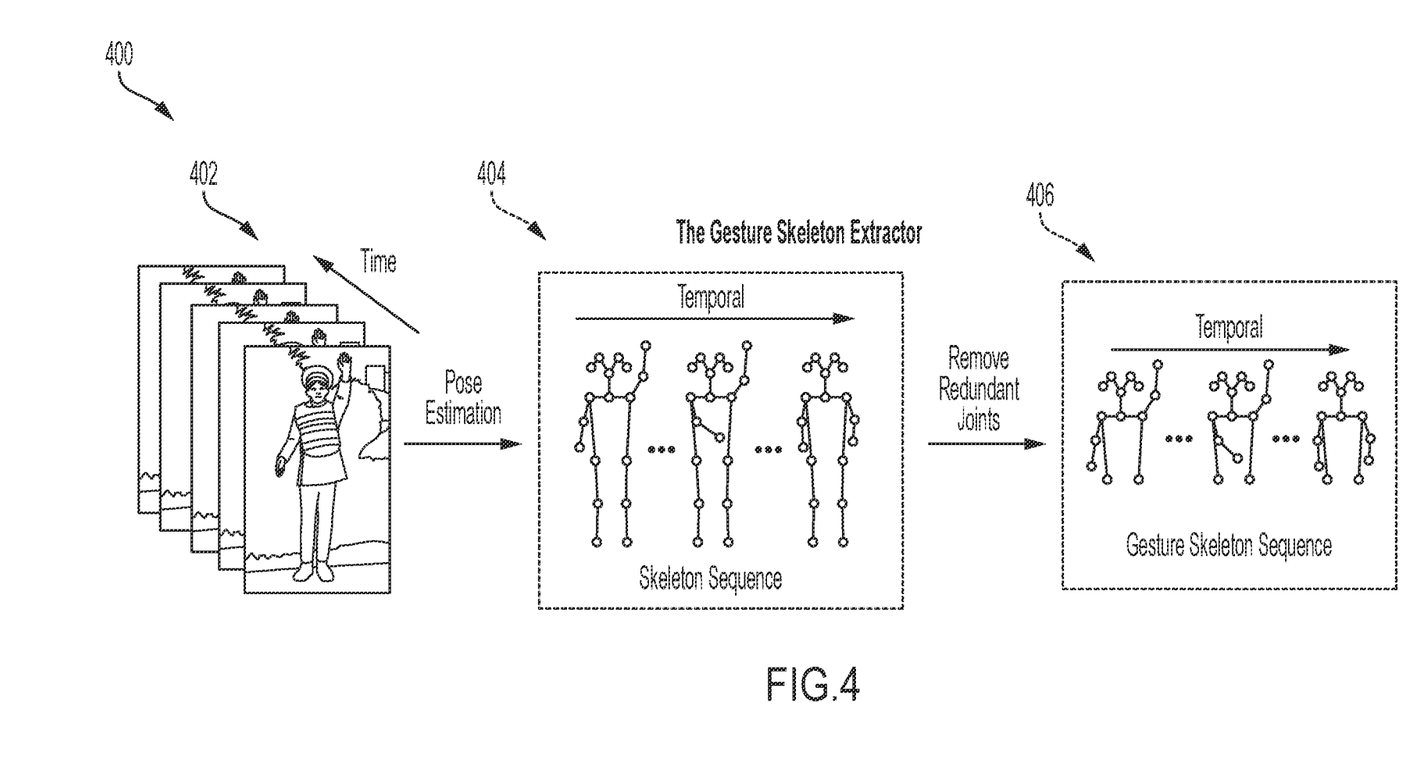
FIG. 4 generally illustrates a flow diagram of a gesture skeleton extractor according to the principles of the present disclosure.

In some embodiments, the controller 100 receive image data, from one or more of the sensors 106 (e.g., that may include at least one image capturing device) that includes at least two images (e.g., taken overtime and related temporally) of an environment associated with vehicle 10. The controller 100 may identify at least one person of interest in the image data. The controller 100 may generate, using a pose estimation model and the image data, a representation of the person of interest. The representation of the person of interest may include a two-dimensional representation of the person of interest, a skeletal representation of the person of interest, any other suitable representation of the person of interest, or a combination thereof. FIG. 4 generally illustrates a gesture skeleton extractor 400. The controller 100 may perform or execute the gesture skeleton extractor 400. For example, the controller 100 may receive image data comprising images 402 that are temporally related. The controller 100 may provide a pose estimation at 404 by generating a skeleton sequence of the person of interest over time. The controller 100 may remove redundant joints at 406.

The controller 100 may determine at least one characteristic associated with the at least two images of the image data. The at least one characteristic associated with the at least two images may include at least one of a temporal difference between at least one aspect of the person of interest in the at least two images, a bone joint distance for at least one aspect of the person of interest, and at least one bone angle for at least one bone of the person of interest. The bone joint distance may correspond to a distance of a bone visible in an image of the two or more images from a first location on the person of interest to a second location on the person of interest. For example, a first bone joint distance may correspond to a first length of a forearm visible in a first image between a location on a hand corresponding to the forearm and a location on an elbow corresponding to the forearm. Additionally, or alternatively, a second bone joint distance may correspond to a second length of the forearm visible in a second image between the location on the hand corresponding to the forearm and the location on the elbow corresponding to the forearm. The at least one bone angle may include a cosine angle relative to the at least one bone, a sine angle relative to the at least one bone, and/or any other suitable angle relative to the at least one bone.

The controller 100 may provide, to the machine learning model 110, at least the representation of the person of interest and the at least one characteristic associated with the at least two images of the image data. The machine learning model 110 may generate a prediction indicating a predicted gesture made by the person of interest in the two or more images. The controller 100 may receive, from the machine learning model 110, the gesture prediction. The controller 100 may cause the vehicle 10 to take at least one action based on the gesture prediction. For example, gesture prediction may indicate that an authorized person of interest is making a stop gesture. The controller 100 may provide one or more commands to an autonomous controller of the vehicle 10 instructing the autonomous controller to use various components of the vehicle 10 (e.g., such as the brakes, engine, electric motor, steering system, and the like) to bring the vehicle 10 to a stop, to cause the vehicle 10 to decrease acceleration or speed, to cause the vehicle 10 to increase acceleration or speed, to cause the vehicle 10 to turn in a desired direction, to cause the vehicle 10 to resume forward progress, and/or the like. It should be understood that the controller 100 may include the autonomous controller, the autonomous controller may be separate from the controller 100, or the controller 100 may be configured to perform at least some autonomous features of the vehicle 10, while another controller may be configured to provide other autonomous features. It should also be understood the controller 100 may be configured to control all or some aspects of vehicle operation of the vehicle 10 and/or the controller 100 may cooperatively operate with any suitable controller or other processing device within the vehicle 10 and/or remotely located from the vehicle 10 to control the aspects of vehicle operation of the vehicle 10.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
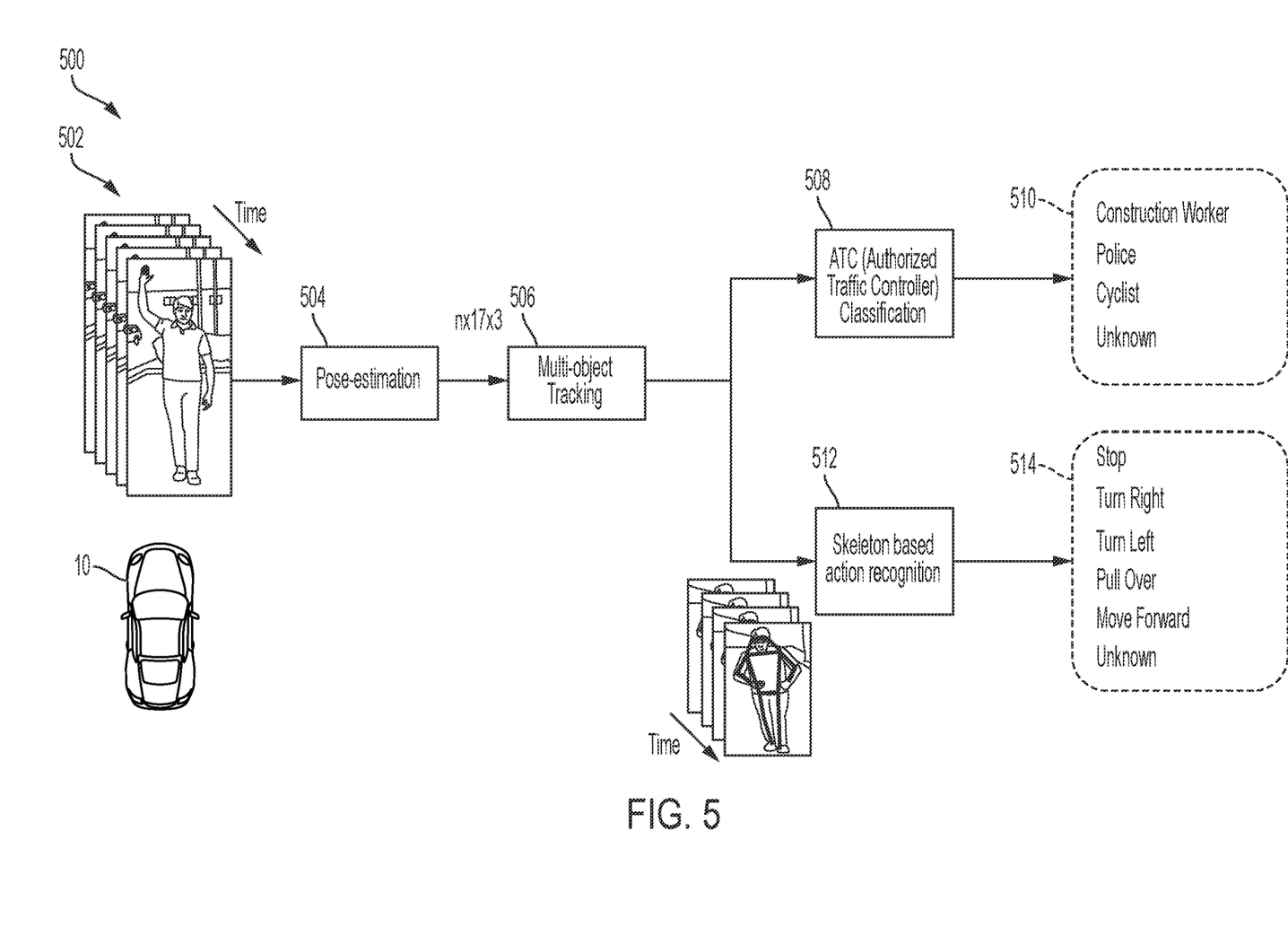
FIG. 5 is a flow diagram generally illustrating a gesture identification method according to the principles of the present disclosure.

FIG. 5 is a flow diagram generally illustrating a gesture identification method 500 according to the principles of the present disclosure. At 502, the method 500 receives image data. For example the controller 100 may receive the image data from one or more of the sensors 106 of the vehicle 10.

At 504, the method 500 generates a pose-estimation. For example, the controller 100 may generate the pose-estimation using two or more images of the image data.

At 506, the method 500 performs a multi-object tracking on the pose-estimation. For example, the controller 100 may perform the multi-object tracking on the pose-estimation. In some embodiments, the controller 100 may use the multi-object tracking to identify one or more persons of interest in the two or more images. The controller 100 may, using the multi-object tracking, assign a unique identifier to each respective person of interest of the one or more persons of interest. The unique identifier for a respective person of interest may be used to identify the respective person of interest in other images of the two or more images.

At 508, the method 500 performs authorized traffic controller classification. For example, the controller 100 may use the machine learning model 110 to classify one or more persons of interest as an authorized traffic controller in the two or more images.

At 510, the method 500 further classifies the authorized traffic controller (e.g., an authorized person) as a construction worker, police officer, cyclist, or unknown person of interest. For example, the controller 100 may use the machine learning model 110 to further classify the authorized traffic controller as a construction worker, police officer, cyclist, or unknown person of interest At 512, the method 500 may perform a skeleton based action recognition. For example, the controller 100 may use the machine learning model 110 to generate a gesture prediction using the skeletal representation of the persons of interest.

Figure 6:
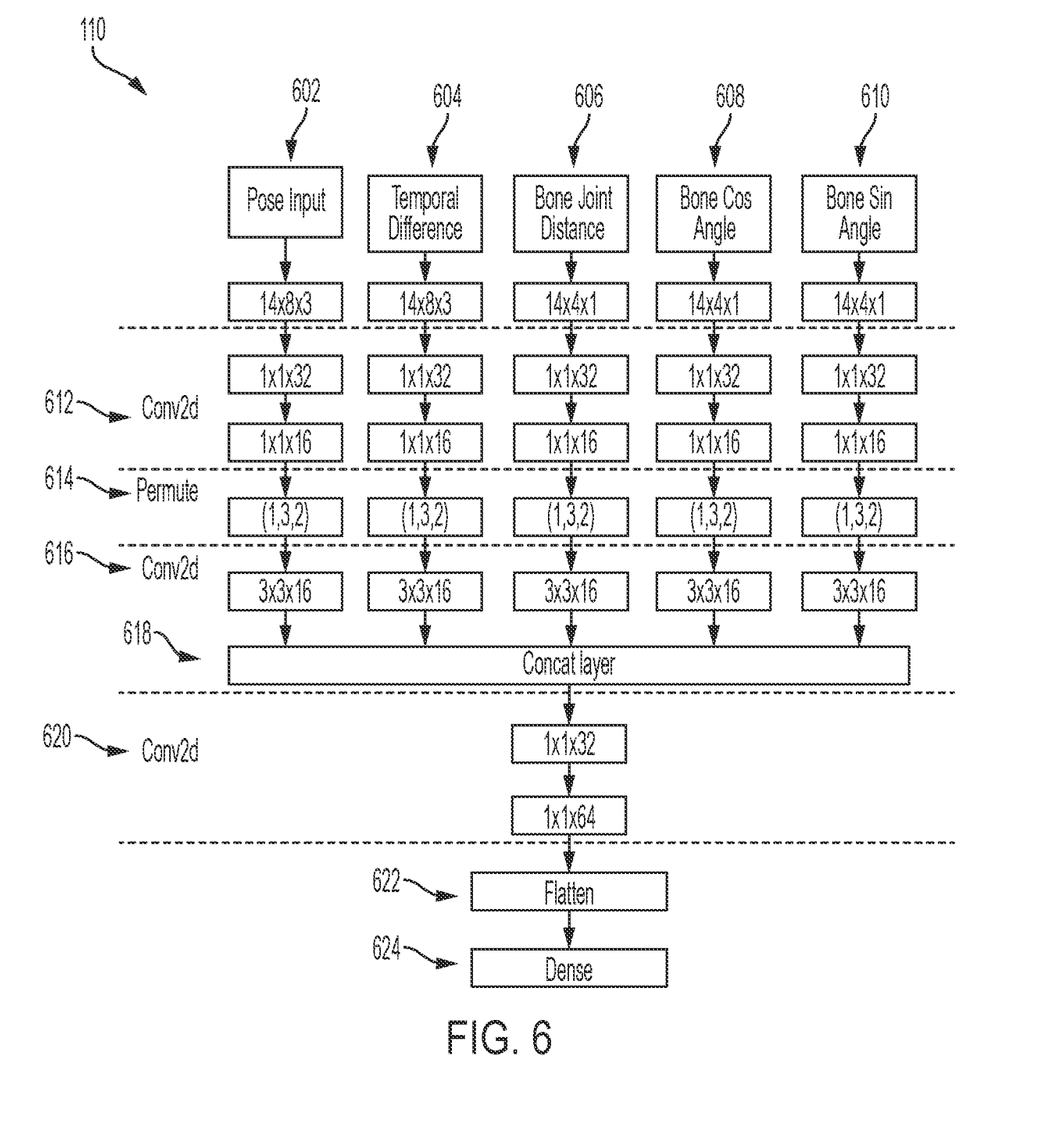
FIG. 6 generally illustrates layers of a machine learning model according to the principles of the present disclosure.

At 514, the method 500 further classifies the gesture associated with the gesture prediction as a stop gesture, a turn right gesture, a turn left gesture, a pull over gesture, a move forward gesture, or an unknown gesture. For example, the controller 100 may use the machine learning model 110 to further classify the gesture associated with the gesture prediction as a stop gesture, a turn right gesture, a turn left gesture, a pull over gesture, a move forward gesture, or an unknown gesture. The machine learning model 110 may include various nodes and layers. As is generally illustrated in FIG. 6, the machine learning model 110 may receive various inputs, such as pose input 602, temporal difference input 604, bone joint distance input 606, and bone angle input, including, but not limited to, bone cosine angle input 608, and bone sine input 610. The various inputs may correspond to a plurality of images provided as input. The machine learning model 110 may receive the input at a first two-dimensional conversion (Conv2d) layer 612. Nodes of the Conv2d layer 612 may process the input and provide an output of the processed data to a permutation (Permute) layer 614. The Permute layer 614 may further process the data and provide an output of the processed data to a Conv2d layer 616. The Conv2d layer 616 may further process the data and provide an output of the processed data to a concatenation (Concat) layer 618. The Concat layer 618 may perform various concatenation processing on the data and provide an output of the concatenated data to a Conv2d layer 620. The Conv2d layer 620 may further process the data and provide an output of the processed data to a flattening layer 622. The flattening layer 622 may receive, from the Conv2D layer 620, a multidimensional matrix representing the processed data. The flattening layer 622 may flatten the multi-dimensional matrix to a single dimensional matrix. A dense layer 624 may receive the single dimensional matrix and classify images of the plurality of images and output a predicted classification (e.g., including a predicted gesture of the person of interest in the plurality of images).

Figure 7:
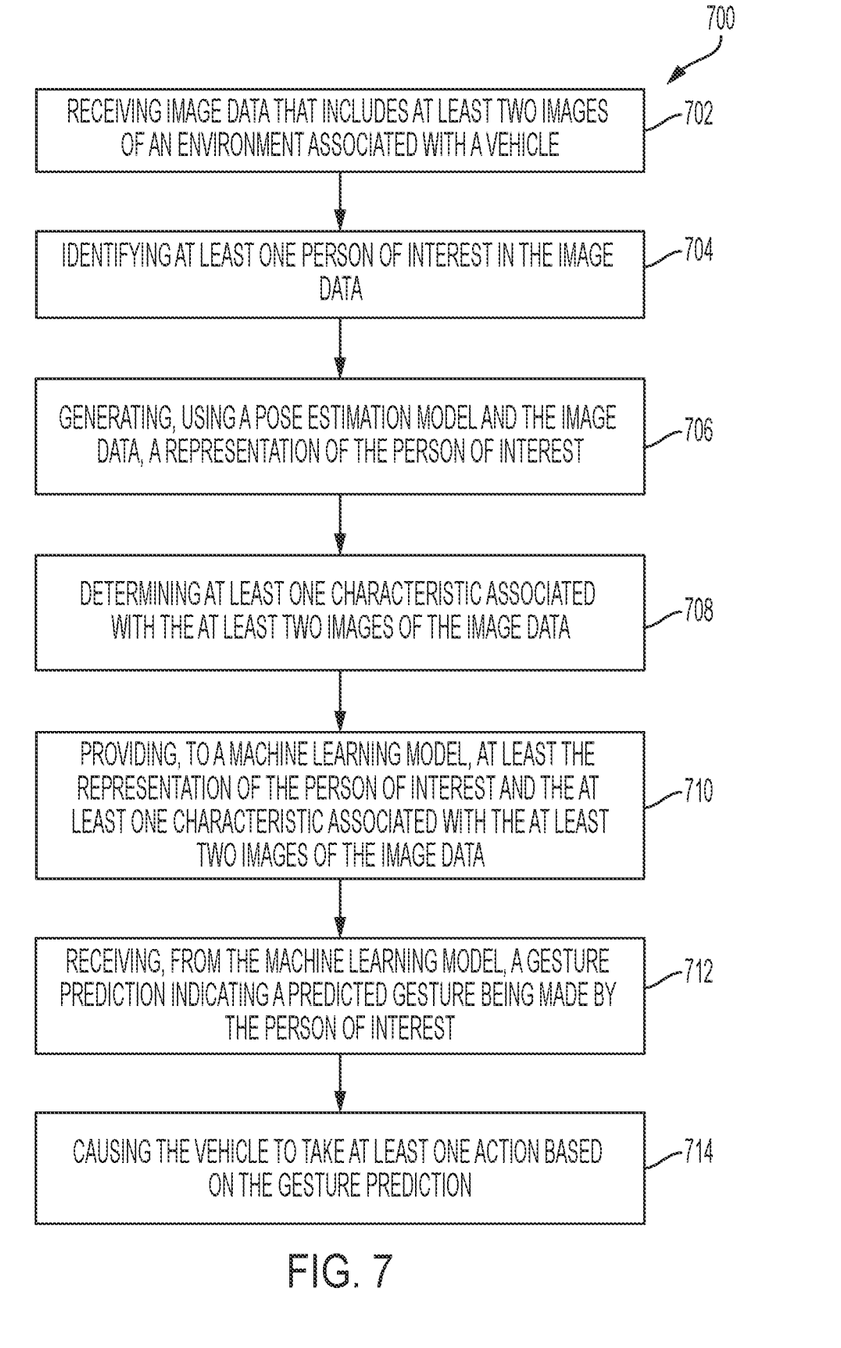
FIG. 7 is a flow diagram generally illustrating an alternative gesture identification method according to the principles of the present disclosure.

FIG. 7 is a flow diagram generally illustrating an alternative gesture identification method 700 according to the principles of the present disclosure. At 702, the method 700 receives image data that includes at least two images of an environment associated with a vehicle. For example, the controller 100 may receive the image data including the two or more images of an environment of the vehicle 10.

At 704, the method 700 identifies at least one person of interest in the image data. For example, the controller 100 may identify the at least one person of interest.

At 706, the method 700 generates, using a pose estimation model and the image data, a representation of the person of interest. For example, the controller 100 may generate, using the pose estimation model and the image data, the representation of the person of interest.

At 708, the method 700 determines at least one characteristic associated with the at least two images of the image data. For example, the controller 100 may determine the at least one characteristic associated with the at least two images of the image data.

At 710, the method 700 provides, to a machine learning model, at least the representation of the person of interest and the at least one characteristic associated with the at least two images of the image data. For example, the controller 100 may provide, to the machine learning model 110, at least the representation of the person of interest and the at last one characteristic associated with the at least two images of the image data.

At 712, the method 700 receives, from the machine learning model, a gesture prediction indicating a predicted gesture being made by the person of interest. For example, the controller 100 may receive, from the machine learning model 110, the gesture prediction indicating the predicted gesture being made by the person of interest in the two or more images of the image data.

At 714, the method 700 causes the vehicle to take at least one action based on the gesture prediction. For example, the controller 100 may cause the vehicle 10 to take the at least one action based on the gesture prediction.

Clause 1. A method for identifying gestures, the method comprising: receiving image data that includes at least two images of an environment associated with a vehicle; identifying at least one person of interest in the image data; generating, using a pose estimation model and the image data, a representation of the person of interest; determining at least one characteristic associated with the at least two images of the image data; providing, to a machine learning model, at least the representation of the person of interest and the at least one characteristic associated with the at least two images of the image data; receiving, from the machine learning model, a gesture prediction indicating a predicted gesture being made by the person of interest; and causing the vehicle to take at least one action based on the gesture prediction.

Clause 2. The method of any clause herein, wherein the representation of the person of interest includes a two-dimensional representation of the person of interest.

Clause 3. The method of any clause herein, wherein the representation of the person of interest includes a skeletal representation of the person of interest.

Clause 4. The method of any clause herein, wherein the at least one characteristic associated with the at least two images includes a temporal difference between at least one aspect of the person of interest in the at least two images.

Clause 5. The method of any clause herein, wherein the at least one characteristic associated with the at least two images includes, for each image of the at least two images, a bone joint distance for at least one aspect of the person of interest.

Clause 6. The method of any clause herein, wherein the at least one characteristic associated with the at least two images includes, for each image of the at least two images, at least one bone angle for at least one bone of the person of interest.

Clause 7. The method of any clause herein, wherein the at least one bone angle includes a cosine angle.

Clause 8. The method of any clause herein, wherein the at least one bone angle includes a sine angle.

Clause 9. The method of any clause herein, wherein the machine learning model is trained using gesture data.

Clause 10. The method of any clause herein, wherein the machine learning model is subsequently trained using at least the gesture prediction.

Clause 11. The method of any clause herein, wherein the machine learning model includes a convolutional neural network.

Clause 11.1 The method of any clause herein, wherein the machine learning model classifies individuals in the image data as one of authorized person of interest or other person of interest.

Clause 11.2 The method of any clause herein, wherein identifying the at least one person of interest in the image data includes receiving from the machine learning model at least one person of interest classified as an authorized person.

Clause 12. A system for identifying gestures, the system comprising: a processor; and a memory including instructions that, when executed by the processor, cause the processor to: receive image data that includes at least two images of an environment associated with a vehicle; identify at least one person of interest in the image data; generate, using a pose estimation model and the image data, a representation of the person of interest; determine at least one characteristic associated with the at least two images of the image data; provide, to a machine learning model, at least the representation of the person of interest and the at least one characteristic associated with the at least two images of the image data; receive, from the machine learning model, a gesture prediction indicating a predicted gesture being made by the person of interest; and cause the vehicle to take at least one action based on the gesture prediction.

Clause 13. The system of any clause herein, wherein the representation of the person of interest includes a two-dimensional representation of the person of interest.

Clause 14. The system of any clause herein, wherein the representation of the person of interest includes a skeletal representation of the person of interest.

Clause 15. The system of any clause herein, wherein the at least one characteristic associated with the at least two images includes a temporal difference between at least one aspect of the person of interest in the at least two images.

Clause 16. The system of any clause herein, wherein the at least one characteristic associated with the at least two images includes, for each image of the at least two images, a bone joint distance for at least one aspect of the person of interest.

Clause 17. The system of any clause herein, wherein the at least one characteristic associated with the at least two images includes, for each image of the at least two images, at least one bone angle for at least one bone of the person of interest.

Clause 18. The system of any clause herein, wherein the at least one bone angle includes a cosine angle.

Clause 19. The system of any clause herein, wherein the at least one bone angle includes a sine angle.

Clause 20. An apparatus for identifying gestures, the apparatus comprising: a processor; and a memory including instructions that, when executed by the processor, cause the processor to: receive image data that includes at least two images of an environment associated with a vehicle; identify at least one person of interest in the image data; generate, using a pose estimation model and the image data, a two-dimensional skeletal representation of the person of interest; determine at least one characteristic associated with the at least two images of the image data, wherein the at least one characteristic includes at least one of a temporal difference, a bone joint distance, and a bone angle; provide, to a machine learning model, at least the two-dimensional skeletal representation of the person of interest and the at least one characteristic associated with the at least two images of the image data; receive, from the machine learning model, a gesture prediction indicating a predicted gesture being made by the person of interest; and cause the vehicle to take at least one action based on the gesture prediction.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for identifying gestures, the method comprising:
   receiving image data that includes at least two images of an environment associated with a vehicle;
   identifying at least one person of interest in the image data;
   generating, using a pose estimation model and the image data, a representation of the person of interest;
   determining at least one characteristic associated with the at least two images of the image data;
   providing, to a machine learning model, at least the representation of the person of interest and the at least one characteristic associated with the at least two images of the image data;
   receiving, from the machine learning model, a gesture prediction indicating a predicted gesture being made by the person of interest;
   providing, to the machine learning model, at least one of temporal difference input, bone joint distance input, and bone angle input;
   receiving, from the machine learning model, a classification associated with the gesture prediction, wherein the machine learning model generates the classification associated with the gesture prediction based on the at least one of the temporal difference input, the bone joint distance input, and the bone angle input; and
   causing the vehicle to take at least one action based on the gesture prediction and the classification associated with the gesture prediction.

2. The method of claim 1, wherein the representation of the person of interest includes a two-dimensional representation of the person of interest.

3. The method of claim 1, wherein the representation of the person of interest includes a skeletal representation of the person of interest.

4. The method of claim 1, wherein the at least one characteristic associated with the at least two images includes a temporal difference between at least one aspect of the person of interest in the at least two images.

5. The method of claim 1, wherein the at least one characteristic associated with the at least two images includes, for each image of the at least two images, a bone joint distance for at least one aspect of the person of interest.

6. The method of claim 1, wherein the at least one characteristic associated with the at least two images includes, for each image of the at least two images, at least one bone angle for at least one bone of the person of interest.

7. The method of claim 6, wherein the at least one bone angle includes a cosine angle.

8. The method of claim 6, wherein the at least one bone angle includes a sine angle.

9. The method of claim 1, wherein the machine learning model is trained using gesture data.

10. The method of claim 1, wherein the machine learning model classifies individuals in the image data as one of authorized person of interest or other person of interest.

11. The method of claim 10, wherein identifying the at least one person of interest in the image data includes receiving from the machine learning model at least one person of interest classified as an authorized person.

12. A system for identifying gestures, the system comprising:
    a processor; and
    a memory including instructions that, when executed by the processor, cause the processor to:
        receive image data that includes at least two images of an environment associated with a vehicle;

identify at least one person of interest in the image data;

generate, using a pose estimation model and the image data, a representation of the person of interest;

determine at least one characteristic associated with the at least two images of the image data;

provide, to a machine learning model, at least the representation of the person of interest and the at least one characteristic associated with the at least two images of the image data;

receive, from the machine learning model, a gesture prediction indicating a predicted gesture being made by the person of interest;

provide, to the machine learning model, at least one of temporal difference input, bone joint distance input, and bone angle input;

receive, from the machine learning model, a classification associated with the gesture prediction, wherein the machine learning model generates the classification associated with the gesture prediction based on the at least one of the temporal difference input, the bone joint distance input, and the bone angle input; and cause the vehicle to take at least one action based on the gesture prediction and the classification associated with the gesture prediction.

13. The system of claim 12, wherein the representation of the person of interest includes a two-dimensional representation of the person of interest.

14. The system of claim 12, wherein the representation of the person of interest includes a skeletal representation of the person of interest.

15. The system of claim 12, wherein the at least one characteristic associated with the at least two images includes a temporal difference between at least one aspect of the person of interest in the at least two images.

16. The system of claim 12, wherein the at least one characteristic associated with the at least two images includes, for each image of the at least two images, a bone joint distance for at least one aspect of the person of interest.

17. The system of claim 12, wherein the at least one characteristic associated with the at least two images includes, for each image of the at least two images, at least one bone angle for at least one bone of the person of interest.

18. The system of claim 17, wherein the at least one bone angle includes a cosine angle.

19. The system of claim 17, wherein the at least one bone angle includes a sine angle.

20. An apparatus for identifying gestures, the apparatus comprising:

a processor; and a memory including instructions that, when executed by the processor, cause the processor to:

receive image data that includes at least two images of an environment associated with a vehicle;

identify at least one person of interest in the image data;

generate, using a pose estimation model and the image data, a two-dimensional skeletal representation of the person of interest;

determine at least one characteristic associated with the at least two images of the image data, wherein the at least one characteristic includes at least one of a temporal difference, a bone joint distance, and a bone angle;

provide, to a machine learning model, at least the two-dimensional skeletal representation of the person of interest and the at least one characteristic associated with the at least two images of the image data;

receive, from the machine learning model, a gesture prediction indicating a predicted gesture being made by the person of interest;

provide, to the machine learning model, at least one of temporal difference input, bone joint distance input, and bone angle input;

receive, from the machine learning model, a classification associated with the gesture prediction, wherein the machine learning model generates the classification associated with the gesture prediction based on the at least one of the temporal difference input, the bone joint distance input, and the bone angle input; and cause the vehicle to take at least one action based on the gesture prediction and the classification associated with the gesture prediction.

* * * * *